Nov. 23, 1954  F. H. TAMMEN  2,694,893
WINDROWING ATTACHMENT FOR POWER-OPERATED MOWING MACHINES
Filed July 27, 1949  4 Sheets-Sheet 1
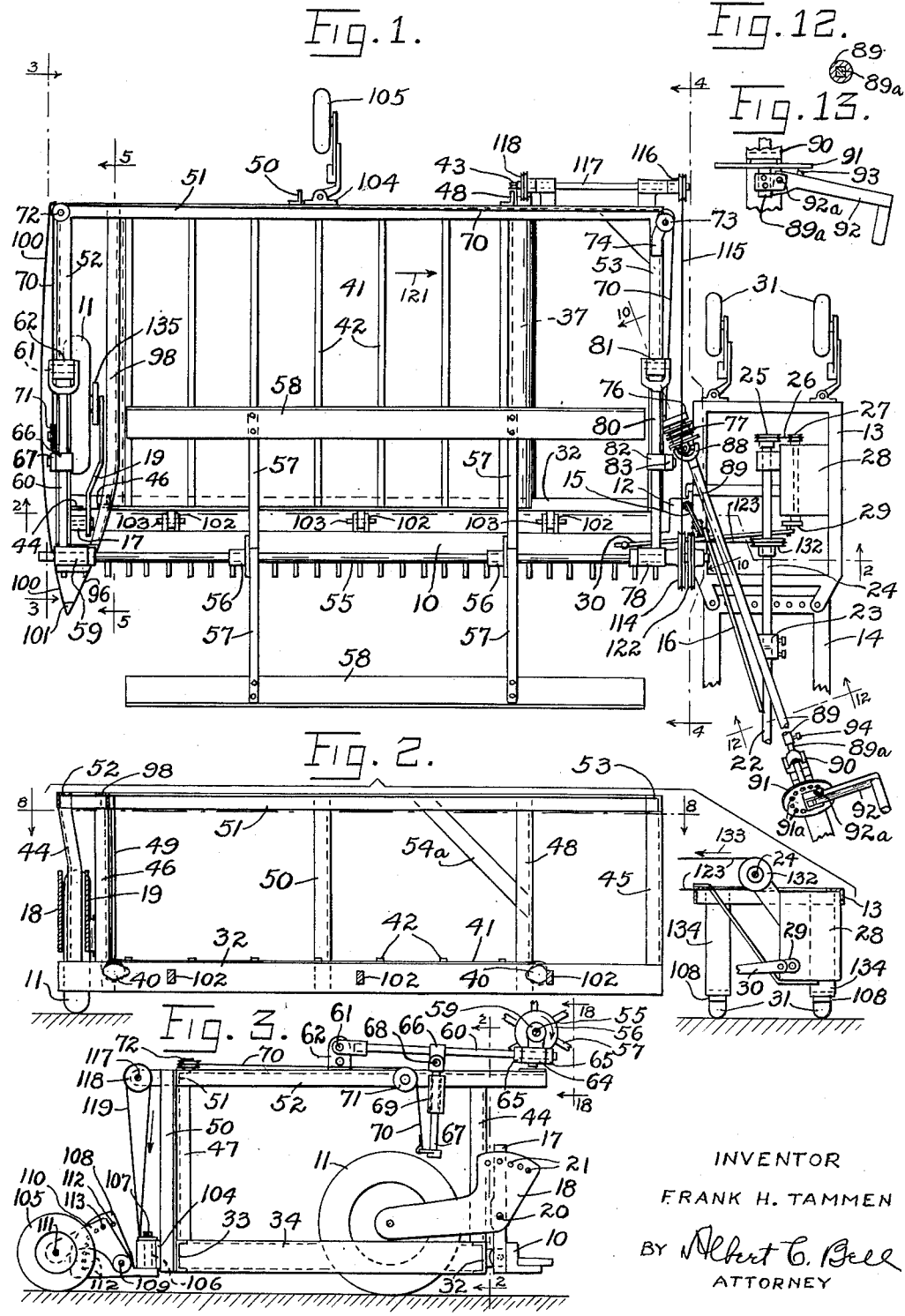
INVENTOR
FRANK H. TAMMEN
BY Albert C. Bell
ATTORNEY

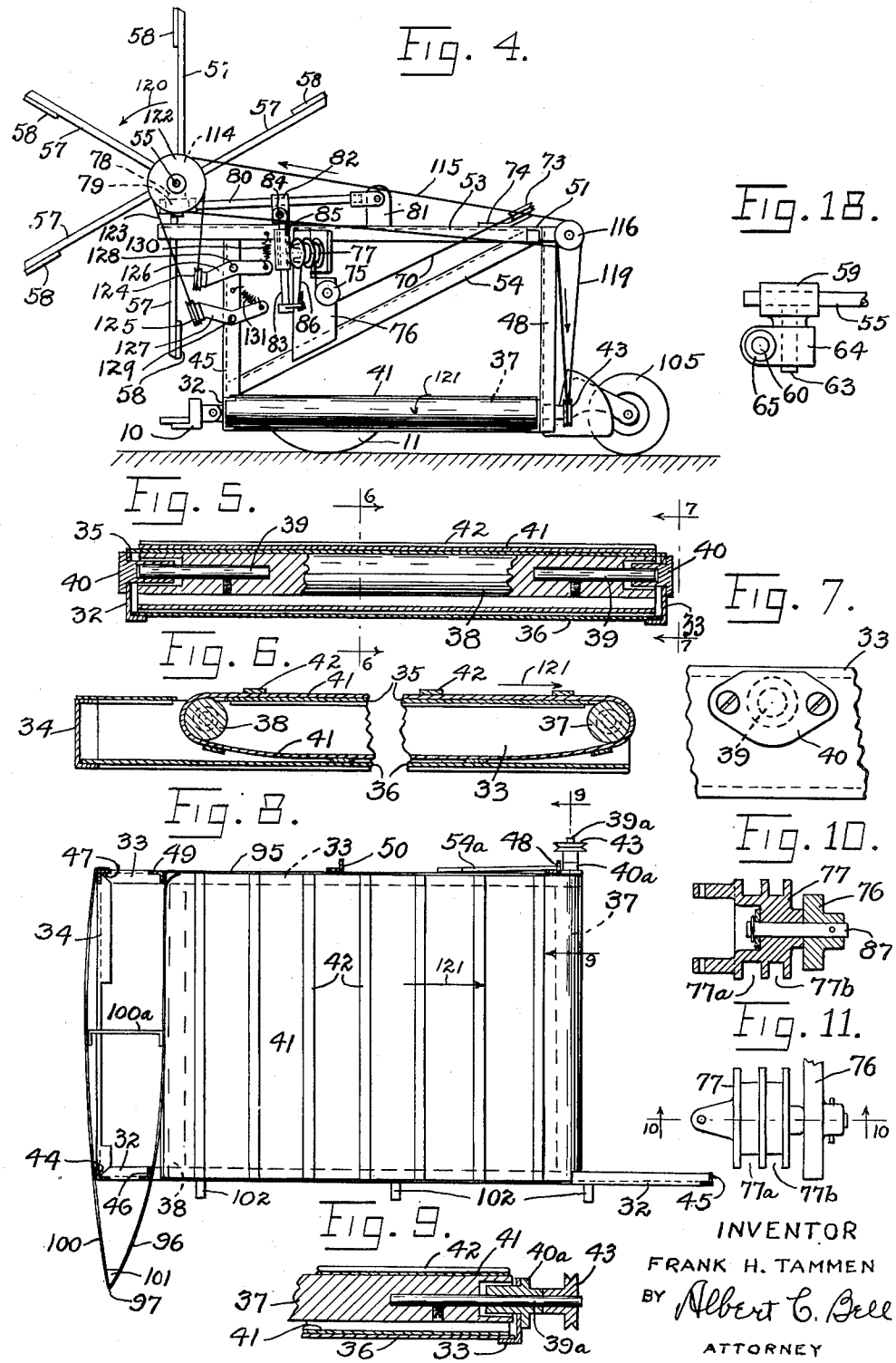

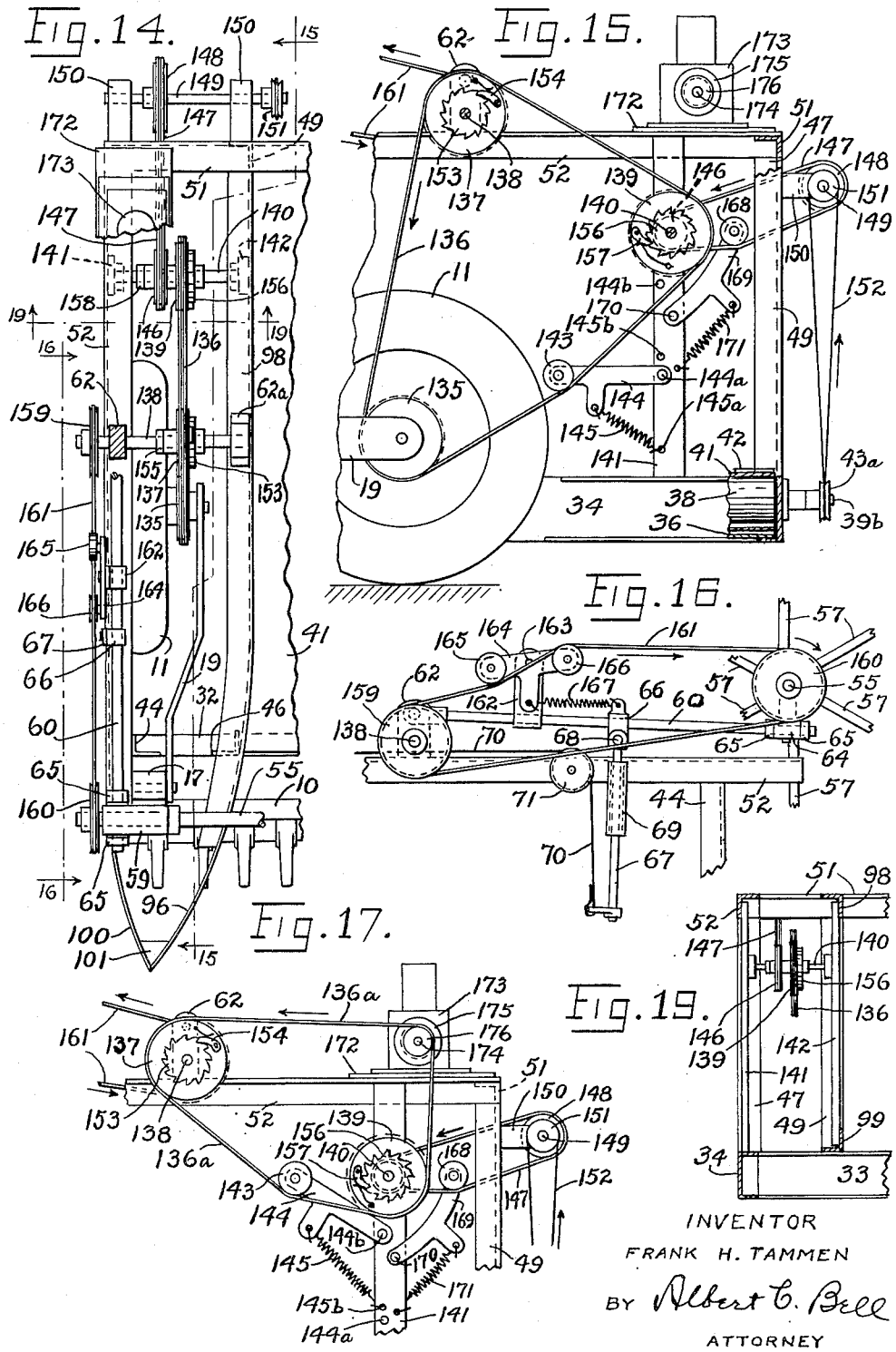

Nov. 23, 1954  F. H. TAMMEN  2,694,893
WINDROWING ATTACHMENT FOR POWER-OPERATED MOWING MACHINES
Filed July 27, 1949  4 Sheets-Sheet 4
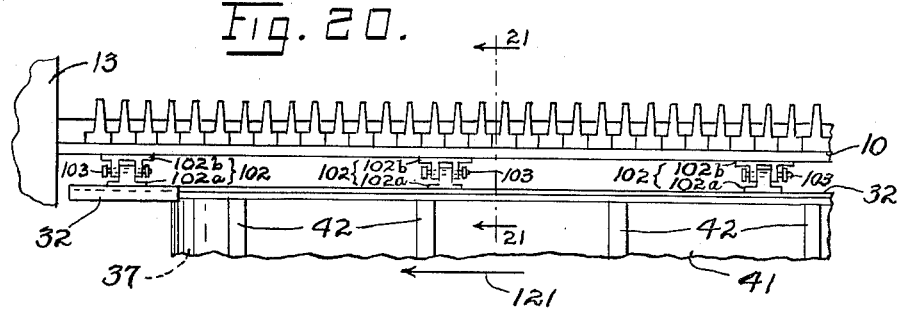
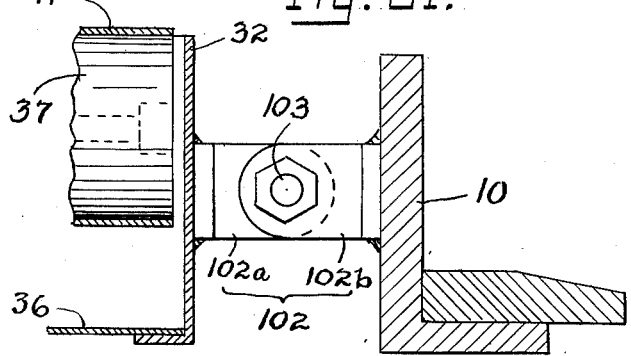
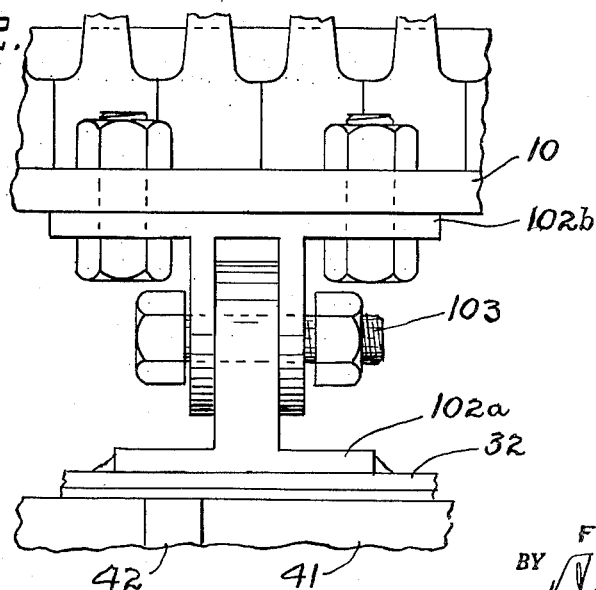
INVENTOR.
FRANK H. TAMMEN
BY Albert C. Bell
ATTORNEY.

United States Patent Office 2,694,893
Patented Nov. 23, 1954

2,694,893

WINDROWING ATTACHMENT FOR POWER-OPERATED MOWING MACHINES

Frank H. Tammen, Fairbury, Ill.

Application July 27, 1949, Serial No. 107,018

4 Claims. (Cl. 56—192)

The attachment of the invention pertains to mowing machines for farm purposes whether tractor or horse operated, which generally have a wide swath, for example, seven feet or more, and which where not provided with gathering means of any kind for the mowed crop, cause considerable damage to the mowed crop by the motive means passing over and crushing it. This is particularly true where the mowed crop is grain of one kind or another, for with a grain crop it is usually desirable to leave it on the ground to cure for a brief time, but in doing so, where no grain collecting means are used, much of the cut grain is crushed and seriously damaged by the motive means passing over the grain cut by each swath, in cutting the next swath.

It is the object of the invention to provide an attachment for mowing machines of the type referred to, which may readily be connected with the sickle housing of a mowing machine, which attachment includes an endless conveyor belt moving laterally of the swath, to receive the cut crop and move it laterally of the swath and to deposit it in a windrow along the side of the swath just cut, that is remote from the standing crop; the conveyor may be of substantially less length laterally of the swath, than the width of the swath, to leave a windrow space of substantial width, for example, about eighteen to twenty inches, and at the same time to leave a space cleared of cut crop and of ample width adjacent the standing crop to receive the motive and controlling mechanism of the mowing machine without engagement thereof with the windrow last formed.

It is a further object of the invention to provide said attachment with means, for example, a power-driven reel, to engage the crop being cut and lay it on the conveyor belt uniformly and in a regular manner, to the end that where the cut crop is a grain crop, the grain heads will be uniformly and symmetrically distributed in the windrow, which is a great advantage in curing the cut grain.

It is a further object of the invention to drive said conveyor and said reel by power derived from the motive means of the mowing machine, which in some cases is accomplished by providing connecting driving devices for said conveyor belt and said reel, with the power take-off shaft of the tractor forming the motive means for the mowing machine where the latter is of the type making that form of driving of the conveyor belt and reel advisable; in other cases, the driving of the conveyor belt and reel is accomplished by similar driving devices connected with the ground wheel at the outboard end of the sickle housing.

It is a further object of the invention to provide means for adjusting the height of the reel above the sickle housing for different crop heights, from the driver's seat on the motive means, during operation of said attachment, to facilitate and maintain orderly and systematic arrangement of the cut crop in the windrow.

It is a further object of the invention to provide said attachment with an auxiliary power plant to drive said conveyor belt and reel, for cases where the motive means of the mowing machine may not have sufficient reserve power to operate said conveyor belt and reel.

The invention will be best understood by reference to the accompanying drawings illustrating preferred embodiments thereof, in which Fig. 1 is a plan view of the windrower attachment of the invention connected with the sickle housing of a tractor-operated mowing machine, Fig. 2 is a vertical, sectional view of part of the structure shown in Fig. 1, taken along the line 2—2 in the latter figure and in Fig. 3, and shows the main framework of the attachment, Fig. 3 is a vertical, sectional view of part of the structure shown in Fig. 1, taken along the line 3—3 in the latter figure, and shows the adjustable supporting means for the reel shaft and also the height adjusting devices for the rear portion of the conveyor and for the outboard end of the sickle housing, Fig. 4 is a vertical, sectional view of part of the structure shown in Fig. 1, taken along the line 4—4 in the latter figure, and shows a further portion of the adjustable supporting means for the reel shaft, Fig. 5 is a vertical, sectional view to an enlarged scale, of part of the conveyor structure, taken along the line 5—5 in Fig. 1, and shows the structure of the conveyor rollers partly in vertical, central, sectional view, Fig. 6 is a vertical, sectional view of the structure shown in Fig. 5, taken along the line 6—6 in the latter figure, Fig. 7 is an end elevation to a further enlarged scale, of one of the bearings for the roller shown in Fig. 5, this view being taken along the line 7—7 in the latter figure, Fig. 8 is a horizontal, sectional view of the structure shown in Fig. 2 taken along the line 8—8 in the latter figure, and shows the conveyor in plan view, and also shows the associated framework of the attachment, Fig. 9 is a vertical, sectional view to an enlarged scale of the driving end of the driving roller of the conveyor shown in Fig. 8, taken along the line 9—9 in the latter figure, Fig. 10 is a vertical, sectional view to an enlarged scale of part of the reel adjusting structure shown in Fig. 1, taken along the line 10—10 in the latter figure and in Fig. 11, and shows the cable drum employed to effect the reel adjustment, Fig. 11 is a plan view of the structure shown in Fig. 10, Fig. 12 is a vertical, sectional view to an enlarged scale of the reel adjusting shaft shown in Fig. 1, taken along the line 12—12 in the latter figure, Fig. 13 is a plan view to an enlarged scale of the operating handle on the end of the reel adjusting shaft shown in Fig. 1, said handle being shown in its locked position in Fig. 1, and its released position in Fig. 13, Fig. 14 shows in plan view similar to Fig. 1 and to an enlarged scale, the outboard portion of the sickle housing and its supporting ground wheel, together with the adjacent portion of the attachment framework, and in this figure driving devices for the conveyor belt and reel of the attachment connected with said ground wheel are shown, instead of the driving devices connected with the power take-off shaft of a tractor as illustrated in Fig. 1, Fig. 15 is a vertical, sectional view of part of the structure shown in Fig. 14, taken along the line 15—15 in the latter figure, Fig. 16 is a left hand elevation of part of the structure shown in Fig. 14, taken along the line 16—16 in the latter figure, Fig. 17 shows in a view similar to Fig. 15, the connection of the auxiliary power plant of the attachment with the driving devices of the conveyor belt and reel of said attachment, Fig. 18 is an elevational view to an enlarged scale of one of the reel bearings, taken along the line 18—18 in Fig. 3, Fig. 19 is a vertical, sectional view of the framework to a reduced scale from that shown in Figs. 14 to 17 inclusive, taken along the line 19—19 in Fig. 14.

Fig. 20 is a diagrammatic plan view of part of the front member of the frame of the conveyor of the attachment mechanism and a corresponding part of the sickle housing of a tractor-mowing machine with which said attachment mechanism may be used, and shows one form of connection of the front parts of the readily separable connection members of said attachment mechanism, with said sickle housing, corresponding to the connection members shown in Figs. 1, 3 and 4, Fig. 21 is a vertical sectional view to an enlarged scale, through the sickle housing and conveyor frame member shown in Fig. 20, taken along the line 21—21 in Fig. 20, and Fig. 22 is a plan view to an enlarged scale relatively to Fig. 20, in which the connection parts shown are the same as in Fig. 21, but the front part of the hinge member shown is attached to the sickle housing by screws or bolts instead of by welding as in Fig. 21.

Similar numerals refer to similar parts throughout the several views.

As shown in Fig. 1, a sickle housing 10 is illustrated, supported at its outboard end by a ground wheel 11, and connected at its other end, as at 12, with and supported by a frame 13 connected with the draw-bar 14 of the tractor (not shown) constituting the motive means of the mowing machine. The connection 12 provides for vertical adjustment of the housing 10 relatively to the frame 13, by a bell-crank 15 and link 16 extending to adjacent the driver's seat, for operation by suitable devices not shown, to leave stubble of a desired height by the mowing operation. The outboard end of the sickle housing 10 has extending upwardly therefrom, a rigid post 17 (Fig. 3), to opposite sides of which angular plates 18 and 19 are piovtally connected at 20. Said plates extend rearwardly from the post 17 on opposite sides of the ground wheel 11 to support the bearings for said wheel. The plates 18 and 19 above the pivotal connection 20 are provided with holes 21 in arcuate arrangement so that by aligning selected ones of said holes with a corresponding hole in the post 17, and inserting a suitable bolt through the aligned holes, the outboard end of said sickle housing may be given an elevation from the ground corresponding to that imparted to the other end of said housing by the link 16.

The power take-off shaft 22 of the tractor, is connected by a coupling 23 with a shaft 24 extending over the frame 13 and carrying at its rear end a pulley 25 engaging a belt 26 driving a pulley 27 by which drive is communicated to the gearing in a gear box 28 carried by the frame 13, the gearing in said gear box being connected with and driving a crank 29 connected with a pitman 30 extending to the sickle in the housing 10 to operate said sickle. The rear end of the frame 13 is supported by swivel caster wheels 31, which wheels are preferably adjustable as to height, to impart a substantially level condition to the frame 13.

The structure thus far described is included in the mowing machine and tractor combination to which the windrower attachment of the invention may be separably connected, which combination and the parts thereof do not of themselves constitute a part of the present invention, and are illustrative only of one type of mowing machine combination with which the windrower attachment of the invention is adapted for use, there being several different types of such mowing machine combinations having rear power take-off shafts and equally adapted for use with the windrower attachment of the invention. In the type illustrated, the tractor may readily be separated from the mowing mechanism, for any other desired use, by removing the frame 13 from the draw-bar 14 and by opening the coupling 23; in some other types of tractor and mowing machine combinations, the sickle housing is supported directly by the tractor frame. As far as the conveyor belt and reel driving devices shown in Figs. 1 to 9 inclusive are concerned, it is immaterial what the type of tractor and mowing machine combination may be, as long as it has a power take-off shaft equivalent to the shaft 22, or an extension of said shaft, which may be employed to operate the conveyor belt and reel of the windrower attachment of the invention as below described.

As shown in Figs. 5 and 6, the conveyor of the invention includes a rigid frame comprising parallel front and rear metal channel bars 32 and 33 rigidly secured at their outer ends, to the ends of a similar side channel bar 34, for example, by welding, said channel bars having their flanges extending inwardly towards each other. A rectangular top plate 35 of sheet metal rests on the upper flanges of said channel bars and is rigidly secured to them, for example by welding. A second and similar rectangular bottom plate 36 of sheet metal is above and rests on the lower flanges of said channel bars and is rigidly secured to them, for example, by welding. A first roller 37 is mounted for rotation in a horizontal position between the ends of the channel bars 32 and 33 at the discharge end of the conveyor, and a second and similar roller 38 is similarly mounted for rotation between the other end portions of the channel bars 32 and 33, parallel with the side channel bar 34 and substantially spaced therefrom for a purpose below described. The rollers 37 and 38 are of substantially smaller diameter than the distance between the plates 35 and 36, they are mounted in parallel relation, and at right angles to the channel bars 32 and 33, and they have their upper surfaces substantially in the plane of the top surface of the plate 35, which plate is cut away or has clearance openings cut through it, to substantially clear said rollers. Each of the rollers 37 and 38, as shown for the roller 38 in Fig. 5, is provided at each end with a metal bearing rod 39 fitting snugly in a coaxial bore in the roller and held therein by a set screw as indicated, the outer end of each of said rods being substantially flush with the adjacent end of the roller. Each of the rollers at each of its ends, is provided with a counterbore of substantial diameter and depth around the end portion of the corresponding rod 39. A bearing 40 is provided for each of the rods 39, comprising a tubular metal structure having a bore fitting the corresponding rod 39 with a sliding fit, and having an outer diameter less than the diameter of the corresponding counterbore. Each bearing 40 is provided with an outer end flange and is supported by having its tubular structure extend with a snug fit through a hole therefor through the web of the corresponding one of the channel bars 32 and 33, in which position the bearing is secured to the channel bar by screws through its outer flange (Fig. 7), the positioning of the bearings in the channel bars being such as to impart the locations above described to the rollers, and the axial length of the bearings being too small to bottom in the counterbores in the rollers. The rollers 37 and 38 are slightly shorter in length than the distance between the webs of the channel bars 32 and 33, the upper flanges of said bars being cut away to clear said rollers, thereby providing for free rotation of said rollers in their bearings.

A canvas belt 41 extends around the rollers 37 and 38, the upper run of said belt being supported by the plate 35, and the lower run of said belt being supported by the plate 36. The belt 41 preferably has secured to its outer surface, spaced cross slats 42 to positively feed cut grain deposited on the belt. The belt 41 has a width substantially equal to the length of the rollers 37 and 38, and the clearance openings referred to in the plate 35 and in the upper flanges of the channel bars 32 and 33, are sufficiently large for the belt 41 and the ends of the slats 42 to pass therethrough without interference.

As shown in Fig. 9, the rear one 39a of the bearing rods in the roller 37 is longer than the other bearing rods 39, and extends through a bearing 40a to carry a driving pulley 43 secured to its outer end portion.

The conveyor frame described, not only constitutes a rigid and substantial housing for the parts of the conveyor structure, but it also constitutes a substantial base for supporting all of the other parts of the windrower attachment. An important part of the attachment construction is a main framework for supporting the reel and operating mechanism of the windrower attachment, which framework is constructed as follows.

Fig. 8 shows the posts of said framework and their relation to the conveyor frame, with the other parts of the windrower attachment removed. As shown in Fig. 8, the front channel bar 32 has a length substanitally equal to the length of the sickle in the sickle housing 10 in Fig. 1, and the length of the conveyor over its rollers and belt, parallel with the channel bar 32, is shorter than said bar 32, first, by the spacing above referred to between the channel bar 34 and the roller 38, and second, by the width of the windrow made by the attachment.

As shown in Fig. 8, vertical posts 44 and 45 comprising angle bars, are rigidly secured at their lower ends respectively to the left hand and right hand ends of the front channel bar 32, for example, by welding, and a third similar post 46 is similarly secured to said bar 32 adjacent the left hand end of the conveyor belt 41. Similar posts 47 and 48 are similarly secured to the ends of the rear channel bar 33, and a third similar post 49 is similarly secured to the bar 33 adjacent the left hand end of the conveyor belt 41. The channel bar 33 has a fourth similar post 50 similarly secured thereto midway between the posts 48 and 49. The posts 48 and 50 are secured to the rear face of the bar 33 as indicated, to avoid interference with the conveyor belt 41, and the other posts referred to, rest at their lower ends on the upper flanges of the channel bars supporting them. As shown in Figs. 1 and 2, an angle bar 51 having a length equal to that of the channel bar 32 is supported by the upper ends of the posts 47, 48, 49 and 50, with its left hand end on the upper end of the post 47 and with its right hand end portion extending beyond the post 48 by substantially the width of the windrow space, said angle bar 51 being rigidly secured to the posts 47, 48, 49 and 50, for example, by welding, and constituting the rear, top member of the windrower framework. An angle bar 52 constituting the left hand top member of said framework, rests on the upper ends of the posts 44 and 47, and is rigidly secured thereto, for example, by welding. An angle bar 53, similar to the angle bar 52 and constituting the right hand top member of the windrower framework, rests at its front end on the post 45 and at its rear end on the outer end of the angle bar 51 extending beyond the post 48 over the windrow space, to which parts said angle bar 53 is rigidly secured, for example, by welding. The rear, right hand corner and otherwise unsupported portion of the upper windrower framework, is given support by an inclined angle bar brace 54, extending from the right hand end of the angle bar 51 (Fig. 1), to the junction of the post 45 with the channel bar 32, as shown in Fig. 4, said brace being rigidly secured to said parts, for example, by welding. The windrower framework may be effectively braced laterally by one or more oblique brace bars between the bar 51 and the posts supporting it, as shown by the brace bar 54a rigidly connected at its ends with the bar 51 and the post 48 (Figs. 2 and 8), for example, by welding.

The windrower attachment includes a reel for laying the cut grain uniformly on the conveyor belt 41 and into the windrow space, about three-quarters of the cut grain being so delivered to the conveyor belt, and about one-quarter thereof being delivered directly to said windrow space, said space having a width equal substantially to one-quarter of the length of the sickle of the mowing machine. Said reel as shown in Figs. 1 and 4, includes a shaft 55 having secured thereto spaced and flanged hubs 56 to the flanges of which the inner ends of equally spaced radial arms 57 are rigidly secured, for example, by bolts. The outer ends of said arms are rigidly secured, for example, by bolts, to the blades 58 of the reel, said blades being equally spaced angularly and being substantially parallel with the shaft 55.

As shown in Fig. 3, one end of the shaft 55 is supported in a bearing 59 mounted on a rod 60 having pivotal connection at its rear end at 61 with a bearing 62 secured to and extending above the frame member 52, the position of said bearing 62 and the length of said rod 60, locating the shaft vertically above the sickle housing 10. To provide for inaccuracies in support of the two ends of the shaft 55, the bearing 59 is supported on the rod 60 as more clearly shown in Fig. 18, which shows the bearing as provided with a vertical trunnion 63 extending downwardly with a sliding fit through a bore therefor in a block 64, said block as indicated in Fig. 3 being mounted with free turning fit on the rod 60 between collars 65 rigidly secured to said rod and restraining said block 64 against movement axially of said rod. Thus the shaft 55 may be inclined either horizontally or vertically, or both, without corresponding movement of the rod 60, without binding of the shaft 55 in its bearing 59.

Vertical adjustment of the reel relatively to the framework supporting it is frequently desirable to most effectively handle grain of different heights, and such adjustment is effected as to the bearing 59 as follows. About midway between the block 64 and the bearing 62, the rod 60 has rigidly secured to it a block 66 to which the upper end of a vertically disposed adjusting rod 67 is pivotally connected at 68. The rod 67 extends loosely through a vertically disposed tubular guide 69 which is secured at its upper end to the frame member 52, said rod extending a substantial distance below said guide 69. The lower end of the rod 67 is connected with the lower end of a flexible cable 70 extending upwardly and around a sheave 71 pivotally mounted on the frame member 52, from which sheave said cable extends horizontally and rearwardly along the member 52 to and around a second sheave 72 pivotally mounted at the intersection of the frame members 52 and 51, from which second sheave said cable 70 extends as shown in Fig. 1, along the rear member 51 of the framework to the opposite side thereof to and around a third sheave 73 pivotally mounted on a bent bracket 74 secured to the frame member 53 adjacent its connection with the frame member 51. As shown in Fig. 4, the cable 70 extends from the sheave 73 downwardly and forwardly to and around a fourth sheave 75 pivotally supported on a plate 76 secured to the frame member 53 and to the brace member 54.

Above the sheave 75, a portion of the plate 76 is bent outwardly to support a two-part rotary drum 77 with its axis extending horizontally and forwardly. The cable 70 extends upwardly from the sheave 75 to one part of said drum 77 to which it is securely attached.

As shown in Fig. 4, the end of the reel shaft 55 remote from the frame member 52 and extending over and beyond the frame member 53, is provided with a bearing 78, trunnion block 79, and supporting rod 80 pivotally connected with a bearing 81 extending upwardly from the frame member 53, similar to and for the same purpose as the bearing 59, trunnion block 64, supporting rod 60 and bearing 62 above described in connection with Fig. 3. Midway between the block 79 and the bearing 81, the rod 80 has rigidly secured to it a block 82 to which the upper end of a vertically disposed adjusting rod 83 is pivotally connected at 84, said rod 83 being similar to and for the same purpose as the rod 67 above described, and being provided with a vertically disposed tubular guide 85 similar to and for the same purpose as the guide 69 above described. The rod 83 extends substantially below the guide 85 and has secured to its lower end a flexible cable 86 extending upwardly to the other part of the drum 77 to which it is attached. The cables 70 and 86 extend in the same direction around the drum 77 so that turning the drum in one direction will simultaneously raise the rods 67 and 83, and turning said drum in the opposite direction will simultaneously lower said rods 67 and 83, thereby providing a means for quickly and easily adjusting the height of the reel relatively to the conveyor of the windrower attachment.

As shown in Figs. 10 and 11, the drum 77 preferably comprises a metal casting provided with two parallel cable receiving grooves 77a and 77b, said drum having a bore that is a sliding fit on a stud 87 projecting from and rigidly secured to the plate 76, said drum having in its outer end a counterbore to contain devices retaining the drum in place on said stud. The outer end of the drum is provided with projecting lugs diametrically opposite each other for connection with a universal coupling for operating the drum as follows. As shown in Fig. 1, the drum 77 is connected with a universal coupling 88 of a well known type, which coupling is also connected with the rear end of an extensible operating shaft 89, 89a extending forwardly to adjacent the driver's seat. As more clearly shown in Fig. 12, the shaft portion 89 is provided with a square bore containing with a sliding fit, the shaft portion 89a of square cross section, to permit longitudinal adjustment of the shaft to suit different tractor conditions. The shaft portion 89a extends to adjacent the drivers seat where it is supported by a bearing bracket 90 connected with the tractor frame, which bracket also rigidly supports a stationary disk 91 coaxially around the shaft portion 89a, which shaft portion has pivotally secured to it at 92a, in front of said disk, an operating crank 92. The disk 91 is provided with an annular row of holes 91a by which the crank may be retained in any desired angular position.

As shown in Fig. 13 with the crank 92 in its released position, a stud 93 carried by said crank is free from the disk 91, permitting the crank to be rotated with the shaft 89, 89a in either direction and to any desired extent, thereby raising or lowering the reel as desired. When the desired vertical adjustment of the reel has been secured, the crank 92 is moved on its pivotal connection 92a to engage the stud 93 in the one of the holes 91a in line with it, and the crank is thereby locked against rotation until the next reel adjustment is desired. When the shaft portion 89a has been adjusted relatively to the shaft portion 89 to suit the particular tractor employed, said shaft portions are secured together by a set screw 94 or equivalent means.

As shown in Fig. 8, shields are provided above the conveyor as follows. A first and back shield 95 comprising a sheet of metal having a vertical width from the channel member 33 to the framework member 51 above said channel member, and a length from a small distance to the right of the post 48 to the post 49, is secured in vertical position to said members 33 and 51 and also to the post 48, 49 and 50 in any suitable manner, for example, by welding, to prevent the cut grain on the conveyor belt from passing over the rear edge thereof. A second and inner side shield 96 of similar vertical width and material to the shield 95, and extending from the post 49 forwardly above the roller 38 to the post 46, and forwardly from said post to the front edge 97 of said shield, is similarly secured to the posts 49 and 46 and to a horizontal frame member 98 (Figs. 1 and 2) supported by and rigidly secured to the upper ends of said posts 49 and 46, for example, by welding. An additional frame member 99 is similarly secured to the posts 49 and 46 adjacent their lower ends and below the frame member 98 (Fig. 19), and is similarly attached to the shield 96 to give the latter substantial support. The shield 96 gradually moves the cut grain enough to the right as it is moved onto the conveyor belt by the reel, to prevent it from entering the space in the framework to the left of the roller 38. A third and outer side shield 100 of similar vertical width and material to the shields 95 and 96, and extending from the post 47 to the front edge of the shield 95, is similarly secured to said post 47 and to the post 44, and with the use of spacing blocks as may be required, to the frame member 52 and to the channel member 34. The shield 100 is substantially in line with the edge of the swath cut by the sickle of the mowing machine, and shields the adjacent standing grain from damage by the windrower attachment. The front edges of the shields 96 and 100 are held closely adjacent each other by a corner block 101 rigidly secured to the front portions of said shields. The front edges of the shields 96 and 100 are somewhat in advance of the sickle and in line with the edge of the swath about to be cut, and constitute a sharp vertical edge dividing the grain to be cut from the grain to be left standing, the grain to be cut being directed towards the conveyor by the shield 96, and the standing grain being slightly deflected away from the windrower attachment by the shield 100. One or more spacing members 100a between and rigidly secured to the shields 96 and 100, may be employed as desired to hold said shields in the indicated relation to each other.

The conveyor structure, the windrower framework, and the reel with its mounting and adjusting mechanism above described constitute, for the type of conveyor and reel operation shown in Figs. 1 to 4 inclusive, the structure of the windrower attachment of the invention, excepting for the means employed to support the conveyor mechanism and to connect it with the mowing machine, and the devices employed to drive the conveyor belt and the reel from the tractor of the mowing machine.

As shown in Fig. 1, the conveyor frame member 32 is connected with the sickle housing 10 by hinge connections 102 having a common horizontal axis parallel with the member 32 and the housing 10. Said hinge connections suport the front portion of the conveyor structure with the top surface of the conveyor frame member 32 substantially at the same height as or slightly above the top surface of the sickle housing 10, the spacing between said housing and the frame member 32 being only large enough to adequately accommodate said connections 102, which connections preferably include removable hinge pins 103 facilitating the ready connection of the windrower attachment with the moving machine, and its disconnection therefrom as desired. First parts of said hinge connections or members are rigidly secured to the conveyor frame member 32, for example, by welding, and second parts of said hinge connections or members are similarly rigidly secured to the sickle housing 10.

To support the rear portion of the windrower attachment, the conveyor frame member 33 has rigidly secured to its midportion, a metal block 104 supporting a caster wheel 105. As shown in Fig. 3, the block 104 is provided with a vertical bore 106 receiving with a sliding fit, a vertical trunnion rod 107 which is rigidly secured at its lower end to a vertical sector plate 108. The plate 108 has pivotally connected therewith at 109, a second plate 110 extending rearwardly from the plate 108 and rigidly secured at its rear end to one end of a horizontal rod 111 extending through the wheel 105 and constituting the axle thereof. The plate 108 is provided with an arcuate row of holes 112 therethrough, and the plate 110 has a hole 113 therethrough in line with the holes 112; as a result, when the ground wheel 11 has been given a desired adjustment in any case to give the sickle a desired height above the ground, by turning the plate 110 on the plate 108, and inserting a bolt through the hole 113 and through a selected one of the holes 112, the plates may be securely clamped together and held in an adjustment placing the conveyor frame member 34 in a horizontal position, or, if desired, giving the rear end of said member a greater elevation above the ground than that given to the front end of said member 34 by the previous adjustment of the ground wheel 11. In any such position of adjustment of the wheel 105, it operates as a caster wheel, since it trails the trunnion rod 107, and the latter permits free turning movement of the wheel 105 and its supporting structure around a vertical axis.

As shown in Fig. 1, the right hand end portion of the reel shaft 55 has rigidly secured to it outside of the windrower framework, a first pulley 114 connected by a belt 115 with a pulley 116 carried by one end of a horizontal shaft 117 mounted for rotation in bearings extending rearwardly from and secured to the frame member 51. The other end of the shaft 117 has rigidly secured to it over the axis of the roller 37, a pulley 118 which, as shown in Fig. 3, engages the upper portion of a downwardly extending quarter-turn belt 119, which belt, as shown in Fig. 4, engages at its lower portion the pulley 43 rigidly secured to the bearing rod 39a extending from the conveyor roller 37 (Fig. 9). Thus the reel and conveyor are connected for simultaneous operation, the quarter-turn of the belt 119 being in such a direction that when the reel is driven in the direction of the arrow 120 in Fig. 4, to move the cut grain onto the conveyor, the canvas belt of said conveyor will have movement imparted to it in the direction of the arrows 121 in Figs. 1, 4, 6 and 8, to feed the cut grain towards the windrow space and deliver it in a windrow in said space.

Outside of the pulley 114 and closely adjacent to said pulley, the shaft 55 has rigidly secured to it a second and similar pulley 122, which as shown in Fig. 4, engages the upper portion of a belt 123 extending downwardly therefrom and around upper and lower sheaves 124 and 125 pivotally mounted respectively on supporting arms 126 and 127 in turn pivotally supported at 128 and 129 on the post 45, and having ends extending beyond their pivotal supports and connected with the post 45 by tension springs 130 and 131. From the lower sides of the sheaves 124 and 125, the belt 123 extends horizontally outwardly away from the post 45 to and around a pulley 132 secured to the shaft 24 (Fig. 2). As a result, when the shaft 24 is rotated in a direction imparting movement to the belt 123 indicated by the arrow 133 in Fig. 2, the reel and the conveyor belt have imparted to them the directions of movement above indicated by the arrows 120 and 121.

The caster wheels 31 above described in connection with the frame 13 supporting the gear box 28 and the extension shaft 24, may be of the same construction as described for the caster wheel 105, by using legs 134 (Fig. 2), extending downwardly from the frame 13 for connection with the mounting blocks 104 of the caster wheels.

The means above described for operating the reel and conveyor of the windrower attachment, may be used in cases where the tractor of the power mowing machine combination, is equipped with a rearwardly extending power take-off shaft, whether the sickle driving mechanism is carried by a frame drawn by the tractor draw bar, or whether said sickle supporting and driving mechanism is incorporated in the tractor housing itself and no extra framework is used either to support the sickle housing or the sickle driving mechanism. The driving belt 123 above described, and the extensible shaft 89, 89a for adjusting the height of the reel, are readily adaptable to many different types of tractor operated mowing machines having rear power take-off shafts.

With some types of motor operated mowing machine combinations, the tractor is not provided with a rear power take-off shaft, and to adapt the windrower of the invention to such mowing machine combinations, as well as to mowing machines having insufficient motive power to operate the reel and conveyor of the windrower attachment, the driving means for said reel and conveyor illustrated in Figs. 14 to 17 inclusive, is provided.

The windrower attachment shown in Figs. 14 to 17 inclusive is of the same construction as to its conveyor frame and its connection with the sickle housing and its rear caster wheel, as to the main framework of the windrower attachment, as to the construction of the conveyor mechanism, as to the construction, mounting and adjustability of the reel, and as to the conveyor shields, as described above in connection with Figs. 1 to 13 inclusive and 18, excepting that the roller 38 of the conveyor mechanism is the driven roller instead of the roller 37, and that the outboard end of the reel shaft 55 is its driving end instead of its end over the windrow space as shown in Fig. 1, the pulleys 114, 122, belt 123, sheaves 124 and 125, arms 126 and 127 and the springs 130 and 131 attached thereto, being dispensed with in the driving mechanism shown in Figs. 14 to 17 inclusive.

As shown in Figs. 14 and 15, the ground wheel 11 has rigidly secured thereto, a sprocket wheel 135 engaging a chain 136 partly encircling a sprocket wheel 137 which is a rotary fit on a shaft 138 mounted in bearings 62 and 62a secured to and extending above the frame members 52 and 98 respectively. From the sprocket wheel 137, the chain 136 continues to and partly encircles a sprocket wheel 139 which is a rotary fit on a shaft 140 supported for rotation in bearings secured to vertical plates 141 and 142 rigidly secured at their upper and lower ends to members of the framework, the plate 141 being secured to the frame member 52 and to the channel member 34 and the plate 142 being secured to the frame members 98 and 99. From the sprocket wheel 139, the chain 136 returns to the sprocket wheel 135 under a tightener wheel 143 rotatably mounted on an arm 144 pivotally supported at 144a by the plate 141, which wheel 143 is pressed firmly against the chain 136 by a spring 145 connected with the arm 144 and with the plate 141.

The shaft 140 has rigidly secured thereto a sprocket wheel 146 engaging a chain 147 extending to and partly encircling a sprocket wheel 148 secured to a shaft 149 mounted for rotation in bearings 150 extending rearwardly from and secured to the upper rear member 51 of the framework. The shaft 149 has rigidly secured to it, a pulley 151 engaged by a quarter-turn belt 152 (Fig. 15), which extends downwardly and drives a pulley 43a rigidly secured to the extended end portion of a bearing rod 39b rigidly secured to the roller 38 of the conveyor to drive the latter, the quarter-turn of the belt 152 being in a direction to move the upper run of the canvas 41 by said belt, towards the windrow space.

As shown in Figs. 14 and 15, the shaft 138 has rigidly secured thereto and closely adjacent the sprocket wheel 137, a ratchet wheel 153 engaged by a spring-actuated pawl 154 carried by the sprocket wheel 137, said sprocket wheel being held adjacent said ratchet wheel by a collar 155 secured to the shaft 138. The teeth of the ratchet wheel 153 are inclined in such a direction that movement of the chain 136 in the direction of the arrow (Fig. 15), by forward movement of the ground wheel 11 will positively drive the shaft 138 through the pawl 154 and ratchet wheel 153, and reverse movement of said chain 136 by backward movement of the wheel 11, will slip the pawl 154 around the ratchet wheel 153 and produce no rotary movement of the shaft 138.

As also shown in Figs. 14 and 15, the shaft 140 has rigidly secured thereto and closely adjacent the sprocket wheel 139, a ratchet wheel 156 engaged by a spring-actuated pawl 157 carried by the sprocket wheel 139, said sprocket wheel being held adjacent said ratchet wheel by the sprocket wheel 146 and by a collar 158 secured to the shaft 140. The teeth of the ratchet wheel 156 are inclined in such a direction that movement of the chain 136 in the direction of the arrow (Fig. 15), by forward movement of the ground wheel 11 will positively drive the shaft 140 through the pawl 157 and ratchet wheel 156, and reverse movement of said chain 136 by backward movement of the wheel 11, will slip the pawl 157 around the ratchet wheel 156 and produce no rotary movement of the shaft 140.

As shown in Fig. 14, the end of the shaft 138 outside of its bearing 62 has secured thereto a pulley 159, and the end of the reel shaft 55 outside of its bearing 59 has secured thereto in line with the pulley 159, a pulley 160. A belt 161 engages the pulley 159 and 160 to drive the reel shaft 55 by rotation of the shaft 138. As shown in Fig. 16, between the block 66 on the reel-supporting rod 60 and the bearing 62 pivotally connected with said rod, the rod 60 has rigidly secured thereto an upwardly extending arm 162 pivotally connected at 163 with the mid-portion of a lever 164 having oppositely extending horizontal arms on the end portions of which idler pulleys 165 and 166 are mounted for rotation in line and in engagement with the belt 161, the pulley 165 being above and the pulley 166 being below the upper run of said belt. The lever 164 has a downwardly extending arm connected at its lower end with one end of a tension spring 167, the other end of which spring is connected with the block 66. The spring 167 maintains a desired tension on the belt 161 for the different positions of vertical adjustment of the reel shaft 55 above described, and insures effective driving of the reel shaft and reel for any said adjustment, and also compensates for wear of the belt 161.

The tightener wheel 143 maintains a uniform tension on the chain 136 and compensates for wear of said chain.

The chain 147 is similarly tightened by a tightener wheel 168 pivotally mounted on an arm 169 (Fig. 15), which is pivotally mounted at 170 on the plate 141 and connected with a tension spring 171 also connected with the plate 141, to press the wheel 168 against the chain 147, thereby maintaining a uniform tension on the chain 147 and compensating for wear of said chain.

If desired, the pivotal supports for the arms 144 and 169 may consist of pivot rods 144a and 170 supported at their ends by the plates 141 and 142.

As a result of the construction above described, forward motion of the sickle housing 10 and ground wheel 11, rotates said wheel and drives the chain 136 in the direction of the arrow (Fig. 15), thereby through the pawls 154 and 157 and ratchet wheels 153 and 156, respectively, driving the shafts 138 and 140 and moving the belt 161 and chain 147 in the direction of the arrows, the movement of the belt 161 rotating the reel in the direction of the arrow (Fig. 16), to move the cut grain onto the conveyor canvas 41, and the movement of the chain 147 driving the shaft 149 and moving the belt 152 in the direction of the arrow (Fig. 15), and thereby moving the upper run of the canvas 41 of the conveyor towards the windrow space and delivering the grain on the canvas to the windrow.

Between successive swaths of the mowing machine and in manipulating it to start desired swaths, turning of the machine is generally required, which, on account of the outboard relation of the ground wheel 11, imparts considerable back rotation to said wheel; the pawls 154 and 157 and ratchet wheels 153 and 156 respectively, permit free back rotation of the wheel 11 whenever for any reason it has back rotation imparted to it, and at such times there is no rotary movement imparted to the reel, nor any movement to the conveyor canvas.

With some types of known power driven mowing machines, the power plant lacks sufficient capacity to drive the reel and conveyor of the windrower attachment, in addition to the mowing mechanism; in other cases, for example, horse-drawn mowing machines of considerable swath, the power required to operate the windrower attachment is not available and cannot readily be supplied. To meet the needs of these cases, the windrower attachment is preferably provided with a small internal combustion engine that may be used or not as desired, and that may be connected with the driving mechanism shown in Figs. 14 to 17 inclusive without material modification of said driving mechanism. Said engine also constitutes an emergency source of power available at any time in case of unusually heavy power demand by the crop or ground contour, or failure for any reason of the delivery of adequate power by the ground wheel of the mowing machine.

As shown diagrammatically in Figs. 15 and 17, the frame members 51 and 52 support a base plate 172 above the corner post 47, which plate has mounted thereon an internal combustion engine of known kind and small power, shown diagrammatically at 173. The engine 173 is preferably of the type having a crank shaft 174 secured to a flywheel 175, the latter having built-in clutch mechanism driving a sprocket wheel 176 which is rotary on the shaft 174 for starting purposes, and is in line vertically with the sprocket wheels 137 and 139.

When it is desired to use the engine 173, the chain 136 (Fig. 15), is removed and a shorter chain 136a, Fig. 17), is applied which partly encircles the sprocket wheels 137, 139, and 176; and to properly tension the chain 136a, the arm 144 is moved from its pivotal connection 144a with the plate 141 (Fig. 15), to a second pivotal connection 144b (Fig. 17), provided for on said plate, and the spring 145 is removed from connection with the plate 141 as shown at 145a in Fig. 15, and is connected with said plate in a second position as shown at 145b in Fig. 17. No other changes are required, the remaining driving mechanism being the same in structure and operation as above described, the direction of rotation of the engine 173 being selected to drive the chain in the direction indicated in Fig. 17. Thus the engine 173 may be quickly and easily connected for use, which at the same time disconnects the ground wheel 11 from the driving mechanism of the windrower reel and conveyor, and when the engine is used, it operates the reel and conveyor of the windrower attachment in the same manner and with the same results as above described in connection with operating the driving mechanism by means of the ground wheel 11.

In Figs. 20 and 21 the front member 32 of the conveyor frame is shown as connected for use, with the sickle housing 10 of a plain tractor-mowing machine by hinge members 102, each comprising a first part 102a having hinge connection with a second hinge part 102b, by means of a removable hinge pin 103, as a result of which the hinge parts 102a and 102b of each hinge member may readily and quickly be disconnected from each other by removing the pin 103, and said parts may as readily and quickly be hinge-connected by inserting the pin 103 through apertures made through said parts to receive it. As illustrated in Figs. 20 and 21, the hinge members 102 are shown with their parts 102a and 102b respectively connected with the frame member 32 and with the sickle housing 10, by welding. The parts 102a may be so connected with the frame member 32 in manufacturing the attachment mechanisms, since said hinge members are parts of said mechanisms, but the connection of the parts 102b with the sickle housing 10 cannot be then effected, because the particular tractor-mowing machine with which any said attachment mechanism is to be used is not then present, and in fact, is not known until later when the owner of a particular tractor-mowing machine, makes known to a dealer in said attachment mechanisms, his desire to purchase one of said attachment mechanisms; the purchaser then learns of the need for having said second hinge parts attached to the sickle housing of his tractor-mowing machine and receives directions as to the location that must be given said second hinge parts on his sickle housing to give them alignment with the first hinge parts on the attachment mechanism he is purchasing; or in many cases the dealer takes care of attaching the second hinge parts to the sickle housing in his repair shop, an operation quickly and easily effected by welding, by any workman skilled in such operations.

The pins 103 may consist of any round iron or steel rods of proper diameter to fit the apertures in the parts 102a and 102b, but a safe procedure is to employ bolts having retaining nuts as shown for the purpose, to avoid accidentally losing said pins.

The part 13 shown in Fig. 20, indicates diagrammatically the housing of the tractor, or the part thereof on which the sickle housing 10 is mounted.

In Fig. 22, the structure is the same as shown in Figs. 20 and 21 with the single exception that the welded connection between the hinge part 102b and the sickle housing 10 is replaced by screws or bolts, which may be employed where for any reason a welded connection is inadvisable.

Since the beginning of the wide spread use of mowing machines having sickle housings 10 as shown in Fig. 20, many different makes of such machines have been placed on the market, and the general practice has developed with said different makes, of mounting on the sickle housing 10, individual and separate guard points, one for each point or tooth of the cutting edge of the reciprocable sickle bar, to facilitate replacement in the case of breakage of said guard points, and to that end, said guard points are generally secured to the sickle housing by screws or bolts similar to the screws or bolts shown in Fig. 22 as securing the hinge part 102b to the sickle housing 10. With various makes of said mowing machines so securing said guard points to their sickle housings, it has been found that certain ones of the screws or bolts so holding said guard points in place, may be loosened and then employed to also rigidly secure the hinge parts 102b to the sickle housings 10 of the machines, without making any change whatever in said sickle housings, the only requirement then being that the spacing of the hinge parts 102a on the frame member 32 must be the same as the standardized spacing of said loosened screws or bolts to effect the necessary alignment of the hinge parts 102a and 102b respectively with each other.

It may here be noted, that in making a purchase of the windrowing attachment mechanism above described, it may develop that the mowing machine of the purchaser, is not provided with a power take-off shaft, and for that or some other reason, a sprocket wheel 135 should be rigidly secured to the ground wheel 11, (Figs. 14 and 15), to drive the reel and conveyor of the attachment mechanism as described. Such an addition to the ground wheel may be readily effected by any skilled mechanic familiar with such machinery; the combination of a mower ground wheel and a sprocket wheel is old, and the dealer will provide the required sprocket wheel to meet the need.

In the above structures, although it is preferred to secure many of the parts together by welding, other equivalent fastening means such as rivets, bolts and screws may be employed, as desired. It will be understood that where chains and belts are described as driving means, in any such case said driving means may consist of any kind of driving chain or belt known to the art and adapted to accomplish the purpose described.

In carrying out my invention, I do not, therefore, limit myself to the particular structures shown and described, as I may employ equivalents thereof without departing from the scope of the appended claims.

What I claim is:

1. In combination with a mowing machine sickle housing, a windrower frame located over and rearwardly of said sickle housing and substantially coextensive therewith, means pivotally and detachably connecting said frame to said sickle housing, said frame having means thereon for supporting the same on the ground, a belt conveyor extending along said frame for movement longitudinally of said sickle housing, and driving means associated with said frame and operatively connected to said conveyor.

2. A machine as set forth in claim 1, in which a reel is mounted on said frame above said sickle housing and in which means are provided for adjusting said reel relative to said sickle housing.

3. A machine as set forth in claim 2, wherein the reel-adjusting means includes a device for locking said reel in its adjusted positions.

4. A machine as set forth in claim 1, wherein the pivotal and detachable connection of said frame to said sickle housing comprises a plurality of horizontally-spaced and axially-alined hinge connections, each consisting of separable parts.

References Cited in the file of this patent

UNITED STATES PATENTS

| Number | Name | Date |
| --- | --- | --- |
| 524,491 | Stephani | Aug. 14, 1894 |
| 665,060 | Busky | Jan. 1, 1901 |
| 1,847,288 | Worthington | Mar. 1, 1932 |
| 2,071,844 | Korsmo | Feb. 23, 1937 |
| 2,375,848 | Hume | May 15, 1945 |